US012665786B2

(12) United States Patent
Nandy et al.

(10) Patent No.: US 12,665,786 B2
(45) Date of Patent: Jun. 23, 2026

(54) BUILDING AN EFFICIENT EVPN VXLAN BROADCAST DOMAIN BASED ON WORKLOAD

(71) Applicant: HEWLETT PACKARD ENTERPRISE DEVELOPMENT LP, Spring, TX (US)

(72) Inventors: Tathagata Nandy, Bangalore (IN); Chethan Chavadibagilu Radhakrishnabhat, Bangalore (IN); Somnath Bhimaram Lohar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 260 days.

(21) Appl. No.: 18/637,150

(22) Filed: Apr. 16, 2024

(65) Prior Publication Data

US 2025/0233773 A1 Jul. 17, 2025

(30) Foreign Application Priority Data

Jan. 17, 2024 (IN) .............................. 202441003286

(51) Int. Cl.
*H04L 12/46* (2006.01)
*H04L 45/02* (2022.01)
(52) U.S. Cl.
CPC ...... *H04L 12/4641* (2013.01); *H04L 12/4633* (2013.01); *H04L 45/04* (2013.01)
(58) Field of Classification Search
CPC .. H04L 12/4641; H04L 12/4633; H04L 45/04
See application file for complete search history.

(56) References Cited

U.S. PATENT DOCUMENTS

| 10,103,902 B1 * | 10/2018 | Sampath ................. H04L 45/16 |
| 11,233,741 B1 * | 1/2022 | N ......................... H04L 47/2441 |

(Continued)

OTHER PUBLICATIONS

Chandra et al., "Capabilities Advertisement with BGP-4", Request for Comments: 3392, Nov. 2002, 6 pages.

*Primary Examiner* — Chris Parry
*Assistant Examiner* — Dixon F Dabipi
(74) *Attorney, Agent, or Firm* — Hewlett Packard Enterprise Patent Department

(57) ABSTRACT

A system determines a replication threshold for a device operating as a tunnel endpoint in an overlay network. The replication threshold indicates a capacity of replication resources of the device. The system obtains a current replication count for the device corresponding to a virtual extensible local area network (VXLAN). The system selects a replication type for a broadcast domain specific to the device and the VXLAN based on the replication threshold and the current replication count. The replication type indicates one of: a first type associated with an ingress replication broadcast domain comprising unicast tunnels; a second type associated with an underlay multicast broadcast domain comprising multicast tunnels; and a third type associated with a hybrid broadcast domain comprising a combination of the first type and the second type. The system creates the broadcast domain specific to the device and the VXLAN based on the selected replication type.

20 Claims, 9 Drawing Sheets

(56)         References Cited

U.S. PATENT DOCUMENTS

| | | | |
|---|---|---|---|
| 2006/0248196 A1* | 11/2006 | Iszlai | H04L 41/00 |
| | | | 709/227 |
| 2016/0330046 A1* | 11/2016 | Yang | H04L 12/4641 |
| 2017/0295130 A1* | 10/2017 | Mahajan | H04L 67/568 |
| 2018/0295030 A1* | 10/2018 | Saha | H04L 43/55 |
| 2021/0058260 A1* | 2/2021 | Xia | H04L 12/4633 |
| 2022/0166639 A1* | 5/2022 | Lindem, III | H04L 67/1095 |
| 2022/0311643 A1* | 9/2022 | Chundu | H04L 12/4675 |
| 2022/0385620 A1* | 12/2022 | Sinha | H04L 61/103 |

* cited by examiner

INGRESS REPLICATION MODEL
200

| BROADCAST DOMAIN 202 | VXLAN1 204 | VXLAN2 206 | VXLAN3 208 | VXLAN4 210 | VXLAN5 212 |
|---|---|---|---|---|---|
| 220 VTEP1 | V2 | V2 | V345 | V345 | 0 |
| 222 VTEP2 | V1 | V1 | 0 | 0 | 0 |
| 224 VTEP3 | 0 | 0 | V145 | V145 | V45 |
| 226 VTEP4 | 0 | 0 | V134 | V135 | V35 |
| 228 VTEP5 | 0 | 0 | V134 | V134 | V34 |

UNDERLAY MULTICAST MODEL
240

| BROADCAST DOMAIN 242 | VXLAN1 244 | VXLAN2 246 | VXLAN3 248 | VXLAN4 250 | VXLAN5 252 |
|---|---|---|---|---|---|
| 260 VTEP1 | G1 | G2 | G1 | G2 | 0 |
| 262 VTEP2 | G1 | G2 | 0 | 0 | 0 |
| 264 VTEP3 | 0 | 0 | G1 | G2 | G1 |
| 266 VTEP4 | 0 | 0 | G1 | G2 | G1 |
| 268 VTEP5 | 0 | 0 | G1 | G2 | G1 |

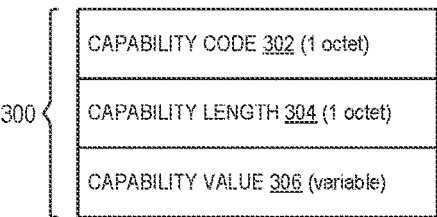

| CAPABILITY CODE 302 (1 octet) |
| CAPABILITY LENGTH 304 (1 octet) |
| CAPABILITY VALUE 306 (variable) |

CURRENT REPLICATION COUNT
400

| BROADCAST DOMAIN 402 | VXLAN1 404 | VXLAN2 406 | VXLAN3 408 | VXLAN4 410 | VXLAN5 412 |
|---|---|---|---|---|---|
| 420 { VTEP1 | 1 | 1 | 3 | 3 | 0 |
| 422 { VTEP2 | 1 | 1 | 0 | 0 | 0 |
| 424 { VTEP3 | 0 | 0 | 3 | 3 | 2 |
| 426 { VTEP4 | 0 | 0 | 3 | 3 | 2 |
| 428 { VTEP5 | 0 | 0 | 3 | 3 | 2 |

```
Algorithm for Selecting the Type of Broadcast Domain for a given VTEP x and VLAN y RTCx : Replication Threshold Count configured on VTEP x RTCx == 0 : Indicates that the node is only capable of ingress replication Cx(y) : Current Replication Count on VTEP x for VLAN y T(BDx(y)) : Type of Broadcast Domain at VTEP x for VLAN y If ( (Cx(y) <= RTCx) || (RTCx == 0) ) {
        T(BDx(y) = "Ingress Replication BD"
}

If ( Cx(y) > RTCx ) {
        T(BDx(y) = "Underlay Multicast BD"
}

For all the ( T(BDx(y) == "Underlay Multicast BD" ) {
        For all the remote VTEPz advertised in BDx(y) {
                If ( RTCz == 0 ) {
                        // Remote VTEPz is "ingress capable" as published
                        // in the EVPN table based on capability advertisement
                        // via the BGP open message)
                        T(BDx(y) = "Hybrid Replication BD"
                }
        }
}
```

EFFICIENT BROADCAST DOMAIN MODEL
470

| BROADCAST DOMAIN 472 | VXLAN1 474 | VXLAN2 476 | VXLAN3 478 | VXLAN4 480 | VXLAN5 482 |
|---|---|---|---|---|---|
| 490 { VTEP1 | V2 | V2 | G1 | G2 | 0 |
| 492 { VTEP2 | V1 | V1 | 0 | 0 | 0 |
| 494 { VTEP3 | 0 | 0 | G1 | G2 | V45 |
| 496 { VTEP4 | 0 | 0 | G1 | G2 | V35 |
| 498 { VTEP5 | 0 | 0 | G1 | G2 | V34 |

500

VTEP1
(VXLANs 1,2,3,4)
502

540

544

542

G2
522

VTEP2
(VXLANs 1,2)
504

G1
520

VTEP3
(VXLANs 3,4,5)
506

554

552

556

VTEP4
(VXLANs 3,4,5)
508

VTEP5
(VXLANs 3,4,5)
510

530 {
- - - - - - POSSIBLE UNICAST
TUNNELS

• • • • HYBRID BD UNICAST
TUNNELS

━━━━━ HYBRID BD MULTICAST
TUNNELS G1

- - - - HYBRID BD MULTICAST
TUNNELS G2

INGRESS REPLICATION
600

| TEP 602 | RX 604 | TX 606 | IN DISCARDS 608 |
|---------|--------|--------|-----------------|
| 610 { VTEP1 | 8 | 8 | 0 |
| 612 { VTEP2 | 2 | 2 | 0 |
| 614 { VTEP3 | 8 | 8 | 0 |
| 616 { VTEP4 | 8 | 8 | 0 |
| 618 { VTEP5 | 8 | 8 | 0 |

FIG. 6A

UNDERLAY MULTICAST
630

| TEP 632 | RX 634 | TX 636 | IN DISCARDS 638 |
|---------|--------|--------|-----------------|
| 640 { VTEP1 | 11 | 4 | 3 |
| 642 { VTEP2 | 13 | 2 | 11 |
| 644 { VTEP3 | 12 | 3 | 4 |
| 646 { VTEP4 | 12 | 3 | 4 |
| 648 { VTEP5 | 12 | 3 | 4 |

FIG. 6B

EFFICIENT BD MODEL
660

| TEP 662 | RX 664 | TX 666 | IN DISCARDS 668 |
|---------|--------|--------|-----------------|
| 670 { VTEP1 | 8 | 4 | 0 |
| 672 { VTEP2 | 2 | 2 | 0 |
| 674 { VTEP3 | 8 | 3 | 0 |
| 676 { VTEP4 | 8 | 3 | 0 |
| 678 { VTEP5 | 8 | 3 | 0 |

FIG. 6C

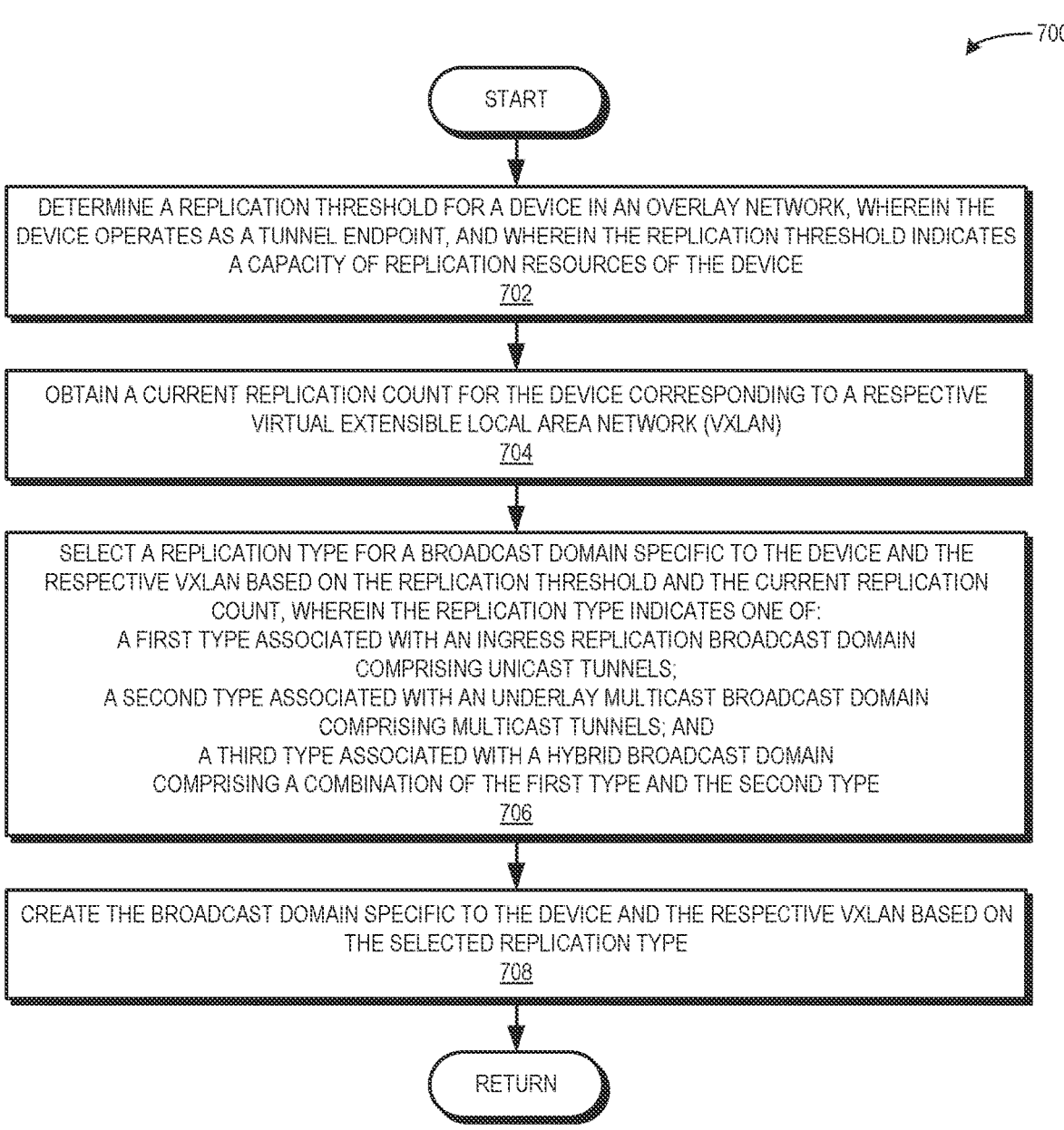

*700*

START

DETERMINE A REPLICATION THRESHOLD FOR A DEVICE IN AN OVERLAY NETWORK, WHEREIN THE
DEVICE OPERATES AS A TUNNEL ENDPOINT, AND WHEREIN THE REPLICATION THRESHOLD INDICATES
A CAPACITY OF REPLICATION RESOURCES OF THE DEVICE
702

OBTAIN A CURRENT REPLICATION COUNT FOR THE DEVICE CORRESPONDING TO A RESPECTIVE
VIRTUAL EXTENSIBLE LOCAL AREA NETWORK (VXLAN)
704

SELECT A REPLICATION TYPE FOR A BROADCAST DOMAIN SPECIFIC TO THE DEVICE AND THE
RESPECTIVE VXLAN BASED ON THE REPLICATION THRESHOLD AND THE CURRENT REPLICATION
COUNT, WHEREIN THE REPLICATION TYPE INDICATES ONE OF:
A FIRST TYPE ASSOCIATED WITH AN INGRESS REPLICATION BROADCAST DOMAIN
COMPRISING UNICAST TUNNELS;
A SECOND TYPE ASSOCIATED WITH AN UNDERLAY MULTICAST BROADCAST DOMAIN
COMPRISING MULTICAST TUNNELS; AND
A THIRD TYPE ASSOCIATED WITH A HYBRID BROADCAST DOMAIN
COMPRISING A COMBINATION OF THE FIRST TYPE AND THE SECOND TYPE
706

CREATE THE BROADCAST DOMAIN SPECIFIC TO THE DEVICE AND THE RESPECTIVE VXLAN BASED ON
THE SELECTED REPLICATION TYPE
708

RETURN

FIG. 7A

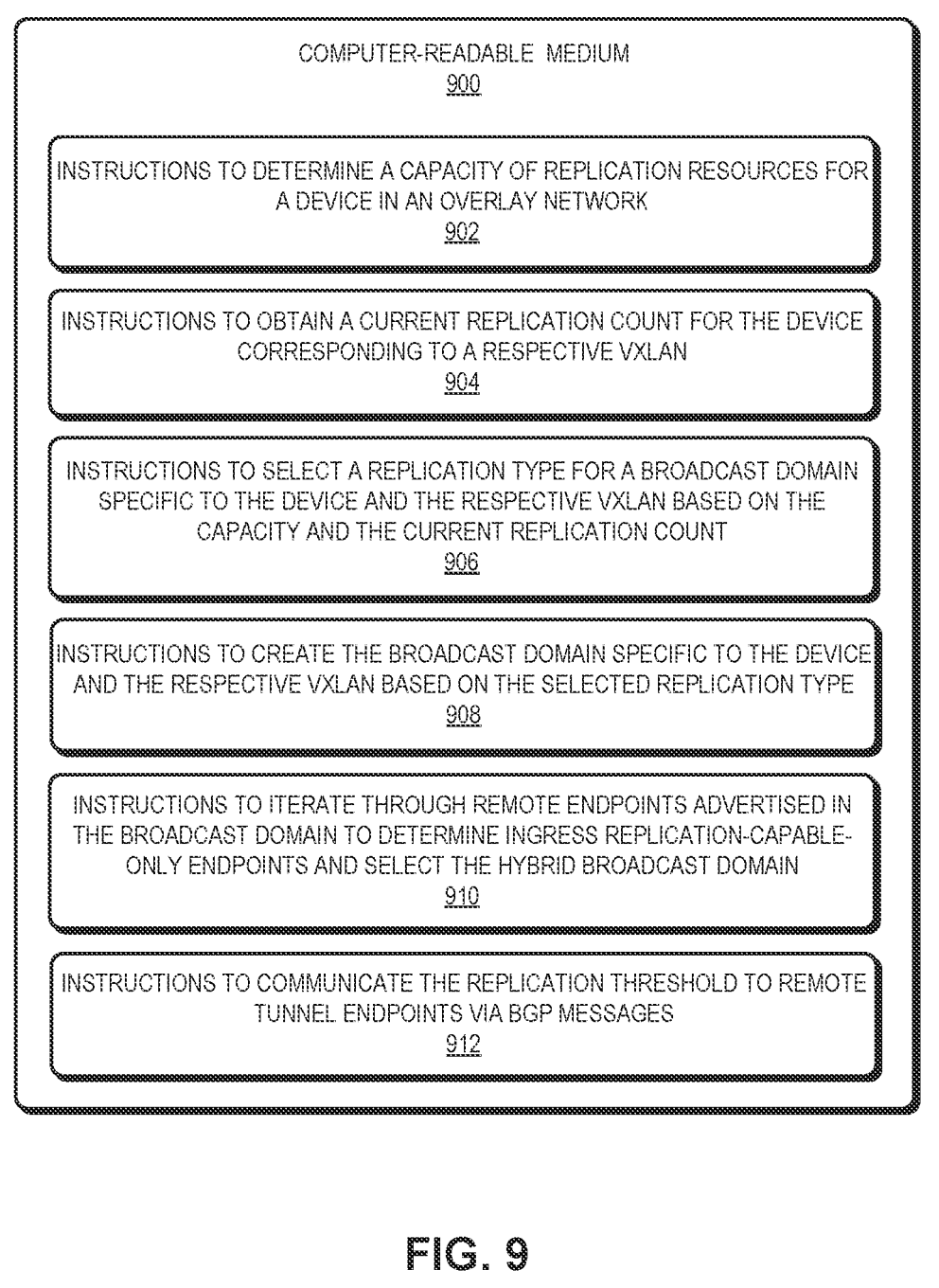

COMPUTER-READABLE MEDIUM
900

INSTRUCTIONS TO DETERMINE A CAPACITY OF REPLICATION RESOURCES FOR A DEVICE IN AN OVERLAY NETWORK
902

INSTRUCTIONS TO OBTAIN A CURRENT REPLICATION COUNT FOR THE DEVICE CORRESPONDING TO A RESPECTIVE VXLAN
904

INSTRUCTIONS TO SELECT A REPLICATION TYPE FOR A BROADCAST DOMAIN SPECIFIC TO THE DEVICE AND THE RESPECTIVE VXLAN BASED ON THE CAPACITY AND THE CURRENT REPLICATION COUNT
906

INSTRUCTIONS TO CREATE THE BROADCAST DOMAIN SPECIFIC TO THE DEVICE AND THE RESPECTIVE VXLAN BASED ON THE SELECTED REPLICATION TYPE
908

INSTRUCTIONS TO ITERATE THROUGH REMOTE ENDPOINTS ADVERTISED IN THE BROADCAST DOMAIN TO DETERMINE INGRESS REPLICATION-CAPABLE-ONLY ENDPOINTS AND SELECT THE HYBRID BROADCAST DOMAIN
910

INSTRUCTIONS TO COMMUNICATE THE REPLICATION THRESHOLD TO REMOTE TUNNEL ENDPOINTS VIA BGP MESSAGES
912

FIG. 9

BUILDING AN EFFICIENT EVPN VXLAN BROADCAST DOMAIN BASED ON WORKLOAD

BACKGROUND

Field

Currently, replication of overlay traffic in Ethernet Virtual Private Network (EVPN) Virtual Extensible Local Area Network (VXLAN) is based on one of two models. In a first model ("ingress replication" model), an ingress virtual tunnel endpoint (VTEP) replicates a packet to each remote VTEP in the broadcast domain (BD) via unicast tunnels. However, when the ingress VTEP needs to support very high replication demands, a significant overhead may be incurred. In a second model (Underlay Multicast model), the ingress VTEP replicates a packet once to a multicast group, which replicates the packet to participating VTEPs via multicast tunnels. However, virtual network identifiers (VNIs) advertised by various VTEPs may be mapped to the same multicast group, even if a remote VTEP may not advertise a specific VNI mapped to the multicast group. As a result, a significant amount of underlay multicast tunneled traffic may get dropped when many VNIs share multicast groups.

BRIEF DESCRIPTION OF THE FIGURES

FIG. 3 illustrates an exemplary format of an optional parameter used in a Border Gateway Protocol (BGP) message to indicate capacity and capability, in accordance with an aspect of the present application.

FIG. 4A depicts a table of the current replication count for the devices and networks of the environment of FIG. 1, in accordance with an aspect of the present application.

FIG. 4B depicts an algorithm for selecting the replication type for a broadcast domain, in accordance with an aspect of the present application.

FIGS. 6A-C depict tables comparing the performance of the environment of FIG. 1 based on the ingress replication model, the underlay multicast model, and the efficient hybrid broadcast domain model, in accordance with an aspect of the present application.

FIG. 7A presents a flowchart illustrating a method for facilitating building an efficient EVPN VXLAN broadcast domain based on workload, in accordance with an aspect of the present application.

FIG. 9 illustrates a non-transitory computer-readable medium for facilitating building an efficient EVPN VXLAN broadcast domain based on workload, in accordance with an aspect of the present application.

In the figures, like reference numerals refer to the same figure elements.

DETAILED DESCRIPTION

Figures 1, 2A, 2B:
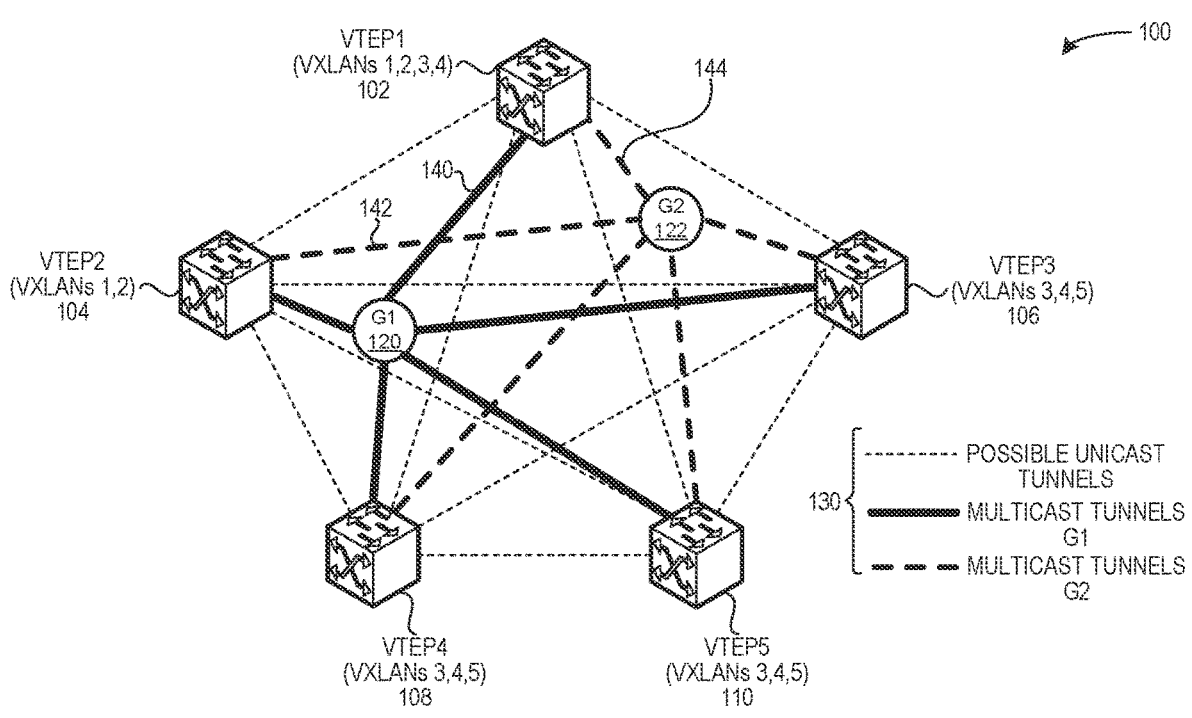
FIG. 1 illustrates an environment depicting an overlay network connected in a mesh topology, in accordance with an aspect of the present application.
FIG. 2A depicts a table representing the ingress replication model for the environment of FIG. 1, in accordance with an aspect of the present application.
FIG. 2B depicts a table representing the underlay multicast model for the environment of FIG. 1, in accordance with an aspect of the present application.

Aspects of the instant application provide a method, computer system, and computer-readable medium which facilitate building an efficient EVPN VXLAN broadcast domain based on workload.

A Layer 2 overlay network can be implemented by encapsulating Layer 2 frames as payloads in Layer 3 packets, e.g., based on a Virtual Extensible Local Area Network (VXLAN) protocol. The Layer 3 packets can be communicated through a Layer 3 underlay network. By using a Layer 2 network which overlays a Layer 3 network, Layer 2 virtual networks (e.g., virtual local area networks (VLANs)) can span across the Layer 3 network, possibly across different physical domains (e.g., different data centers, different campuses, different geographic sites, etc.). The spanning of a VLAN across different physical domains can refer to stretching or extending the VLAN across the different physical domains.

Network devices (e.g., switches or other types of network devices) can be used in a Layer 2 overlay network for a virtual private network (VPN) over a set of tunnels with corresponding tunnel endpoints. A respective tunnel endpoint can deploy a VPN by mapping a respective client VLAN to a corresponding tunnel network identifier (TNI). If the tunnel is formed based on VXLAN, the TNI can be a virtual network identifier (VNI) of a VXLAN header, and a tunnel endpoint can be a VXLAN tunnel endpoint (VTEP).

A network device used in a Layer 2 overlay network for a VPN can include a data plane entity that performs VXLAN encapsulation and decapsulation. This type of data plane entity can be referred to as a VXLAN tunnel endpoint (VTEP). The VTEP can be part of the data plane of the underlay and overlay network used for forwarding of data by the network device. The network device can also include a control plane entity (which is part of the control plane of the underlay and overlay network) that exchanges control information with other network devices to enable forwarding of data by the network devices. In some examples, the control plane of the underlay and overlay network can operate based on the Ethernet Virtual Private Network (EVPN) technology.

An Ethernet VPN (EVPN) can be deployed as an overlay network over a set of interconnected networks (e.g., VXLANs). The expansion of EVPN VXLAN into campus networks can result in an increase in the number of broadcast domains and remote endpoints, which in turn can result in edge nodes (i.e., ingress nodes or switches) handling and replicating an increasing amount of traffic. Replication requirements for ingress nodes may be based on dynamic traffic conditions, i.e., broadcast domains may experience unpredictable high-density or low-density traffic.

As described above, replication of overlay traffic in EVPN VXLAN is currently based on one of two models. In a first model (ingress replication), an ingress VTEP replicates a packet to each remote VTEP in the broadcast domain via unicast tunnels. However, when the ingress VTEP needs to support very high replication demands, a significant overhead may be incurred. In a second model (underlay multicast), the ingress VTEP replicates a packet once to a multicast group (e.g., via a spine switch), which replicates the packet to participating VTEPs via multicast tunnels. However, virtual network identifiers (VNIs) advertised by various VTEPs may be mapped to the same multicast group, even if a remote VTEP may not advertise a specific VNI mapped to the multicast group (i.e., does not participate in the VNI flood tree). As a result, a significant amount of underlay multicast tunneled traffic may get "ingress discarded" or "in discarded" (i.e., dropped) when many VNIs share multicast groups. An exemplary EVPN and corresponding replication tables for the ingress replication model and the underlay multicast model are described below in relation to FIGS. 1, 2A, and 2B.

The described aspects of the application address the limitations of replication resources and the inefficiencies created by the dropped traffic of the two existing models, by creating an efficient broadcast domain based on the replication requirement. The described aspects provide a system which can use an EVPN attribute referred to as the "Replication Threshold Count" (RTC), which can indicate a replication capacity of a given network device. The system can dynamically classify the broadcast domain for the given network device and VNI for a virtual extensible local area network (VXLAN) into one of three replication types based on a comparison of the RTC and the current count of discovered endpoints by the given network device. The three replication types can include: the ingress replication type or model; the underlay multicast type or model; and a "hybrid replication" type or model. An algorithm for classifying and selecting the replication type is described below in relation to FIGS. 4A-4C.

Thus, in contrast to current replication models, in which only the first or the second type can be used as the replication type for a broadcast domain, the described aspects provide a third hybrid type which allows both the first and the second type to be used as the replication type for the broadcast domain. As described below in relation to FIGS. 6A-6C, using the third hybrid replication type for a broadcast domain can result in significant improvements in performance and efficiency. For example, in terms of replicating flood packets, the hybrid model can result in a performance gain of ~200% over the ingress replication model. As another example, in terms of utilizing the underlay traffic and reducing the number of dropped packets, the hybrid model can result in a performance gain of ~150% over the underlay multicast model.

The terms "ingress discard" or "in discard" are used interchangeably in this disclosure and refer to packets which are dropped, e.g., using the underlay multicast replication method, due to multiple VNIs advertised by various VTEPs being mapped to the same multicast group, but where not all of the VTEPs advertise all the mapped VNIs. These "ingress discards" or "in discards" are described below in relation to FIGS. 1 and 2B.

In this disclosure, the term "switch" is used in a generic sense and can refer to any standalone network device or fabric switch operating in any network layer. The term "switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. The term "packet" should not be interpreted as limiting examples of the present invention to a particular layer of a network protocol stack. The term "packet" can be replaced by other terminologies referring to a group of bits, such as "message," "frame," "cell," "datagram," or "transaction." Furthermore, the term "port" can refer to a port that can receive or transmit data. The term "port" can also refer to the hardware, software, and/or firmware logic that can facilitate the operations of that port.

Environment for Facilitating Building an Efficient Broadcast Domain in an Overlay Network FIG. 1 illustrates an environment depicting an overlay network 100 connected in a mesh topology, in accordance with an aspect of the present application. Overlay network 100 can be part of an Ethernet network, InfiniBand network, or other network, and may use a corresponding communication protocol, such as Internet Protocol (IP), FibreChannel over Ethernet (FCOE), or other protocol. Overlay network 100 can include one or more network devices (e.g., switches) and may include heterogeneous network components (e.g., layer-2 and layer-3 hops and tunnels).

For example, network 100 can include five network devices (102, 104, 106, 108, and 110) and end devices (e.g., client devices or servers, not shown) coupled to the network devices. Network devices 102-110 can operate as tunnel endpoints (e.g., VTEPs in a VXLAN) in overlay network 100, and overlay network 100 can be a distributed tunnel fabric in which network devices 102-110 can be coupled to each other via tunnels. Examples of tunneling protocols can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A VPN, such as an EVPN, can be deployed as overlay network 100 over a set of tunnels or interconnected networks (e.g., VXLANs), as described herein. The tunnels in overlay network 100 can be formed over an underlay network (not shown), which can be a physical network, and a respective link of the underlay network can be a physical link. An index 130 can indicate various types of tunnels: possible unicast tunnels can be depicted with a light dashed line; multicast tunnels for a multicast group G1 can be depicted with a heavy solid line; and multicast tunnels for a multicast group G2 can be depicted with a heavy dashed line.

Each of network devices 102-110 can be indicated with the list of VLANs (or VNIs for VXLANs) advertised in the Inclusive Multicast Ethernet Tag (IMET) Type-3 Route (RT-3) of the Border Gateway Protocol (BGP) update messages transmitted between the nodes. For example: a VTEP1 102 node can advertise VXLANs as indicated by (1,2,3,4); a VTEP2 104 node can advertise VXLANs as indicated by (1,2); a VTEP3 106 node can advertise VXLANs as indicated by (3, 4, 5); a VTEP4 108 node can advertise VXLANs as indicated by (3, 4, 5); and a VTEP5 110 node can advertise VXLANs as indicated by (3, 4, 5).

A node may receive a multicast data packet (e.g., from a source or end device, not shown) and replicate the packet by distributing the packet via either individual tunnels (using the ingress replication model) or via multicast tunnels (using the underlay multicast model).

FIG. 2A depicts a table 200 representing the ingress replication model for the environment of FIG. 1, in accordance with an aspect of the present application. Table 200 can include entries 220-228 with fields indicating the broadcast domain (broadcast domain 202) and the respective VXLANS (VXLAN1 204, VXLAN2 206, VXLAN3 208, VXLAN4 210, and VXLAN5 212) advertised in the network. Each entry in table 200 can indicate the broadcast domain (BD) for each VTEP/VNI/VXLAN domain using the ingress replication model.

The notation "BDx(y)" can indicate the broadcast domain (i.e., the remote tunnel endpoints to which the network device sends replicated traffic) of VTEP x for VXLAN y. For example, entry 220 indicates the broadcast domain of VTEP1 for the respective VXLANs, where VTEP1 102 advertises "(VXLANs 1, 2, 3, 4)": VXLAN1 has VTEP2 104 (indicated as "V2") as the remote tunnel endpoint; VXLAN2 has VTEP2 104 (indicated as "V2") as the remote tunnel endpoint; VXLAN3 has VTEP3 106, VTEP4 108, and VTEP5 110 (indicated as "V345") as the remote tunnel endpoints; VXLAN4 has VTEP3 106, VTEP4 108, and VTEP5 110 (indicated as "V345") as the remote tunnel endpoints; and VXLAN5 has no remote tunnel endpoints (indicated as "0"). Thus, when a flood (i.e., multicast traffic) occurs on VTEP1 102 on VXLAN3, VTEP1 102 can replicate the packet to VTEP3 106, VTEP4 108, and VTEP5 110, represented by "BD1(3)=V345." Unicast tunnels (indicated by light dashed lines in FIG. 1) can be created and added to each specific broadcast domain or replication group based on the advertised VXLANs. FIG. 1 does not indicate the exact unicast tunnels created based on the topology, and instead indicates a unicast tunnel from each ingress node to each of its peer nodes and assumes that each ingress node can be ingress replication-capable. However, in the ingress replication model, each ingress VTEP may need to support very high replication demands and may not have sufficient replication resources for handling the necessary replication requirements.

FIG. 2B depicts a table 240 representing the underlay multicast model for the environment of FIG. 1, in accordance with an aspect of the present application. Table 240 can include entries 260-268 with fields indicating the broadcast domain (broadcast domain 242) and the respective VXLANS (VXLAN1 244, VXLAN2 246, VXLAN3 248, VXLAN4 250, and VXLAN5 252) advertised in the network. Each entry in table 240 can indicate the broadcast domain (BD) for each VTEP/VNI/VXLAN domain using the underlay multicast model. In the underlay multicast model, instead of sending a replicated packet directly to an individual remote tunnel endpoint via a unicast tunnel, the network device can send a replicated packet directly to a multicast group to which the VXLANs/VNIs have been previously mapped. The multicast group can operate based on a bidirectional multicast protocol, such as a Bi-directional Protocol Independent Multicast (PIM) or PIM-BDR protocol. The network device can maintain a set of multicast groups associated with the PIM-BIDR and each multicast group can be identified by a corresponding multicast address (e.g., a range of multicast IP addresses).

For example, using two multicast group IP addresses indicated by "G1" (120) and "G2" (122), the odd-numbered VXLANs (VXLAN1, VXLAN3, VXLAN5) can be mapped to G1 and the even-numbered VXLANs (VXLAN2, VXLAN4) can be mapped to G2. Thus, "BD1(3)=G1" can indicate that the broadcast domain on VTEP1 102 for VXLAN3 248 can be G1, as indicated in entry 260 for VXLAN3 248 (because VXLAN3 is mapped to the multicast group IP address for G1) and can use a multicast tunnel 140 associated with the multicast group IP address for G1 (as indicated by the heavy bold line for "multicast tunnels G1"). VTEP1 102 can thus join the PIM BIDIR tree for G1.

Similarly, BD(1), BD2(1), BD3(3), BD3(5), BD4(3), BD4(5), BD5(3), and BD5(5) also indicate that the corresponding broadcast domain is G1. Thus, when a flood occurs on, e.g., VXLAN5 at VTEP5 110, the ingress VTEP5 110 can send out a multicast VXLAN packet with the G1 multicast IP address (where VTEP1 102 and VTEP2 104 have both already joined the PIM BIDIR tree for G1). However, because VTEP1 102 and VTEP2 104 do not advertise VXLAN5, both VTEP1 102 and VTEP2 104 would drop or "ingress discard" the multicast VXLAN packet sent by the flood on VXLAN5 based on the G1 multicast IP address, since the associated VXLAN5 has not been created on VTEP1 102 and VTEP2 104. For example, as depicted by a multicast tunnel 144 from VTEP1 102 to G2 and by a multicast tunnel 142 from VTEP2 104 to G2 (as indicated by the heavy dashed line for "multicast tunnels G2"), VTEP1 102 and VTEP2 104, respectively, would receive the multicast VXLAN packet sent as a result of the flood on VXLAN5 and would discard the multicast VXLAN packet. This ingress discard limitation associated with the underlay multicast model can result in additional unnecessary traffic, which can reduce the efficiency and traffic utilization of the overall network.

Using Replication Threshold Count and Current Replication Count to Determine a Broadcast Domain Type In current replication models, the unicast tunnels and the multicast tunnels depicted in network 100 in relation to FIGS. 2A and 2B cannot exist together in the same broadcast domain. The described aspects address the limitations of using only one of the ingress replication model and the underlay multicast model by creating a hybrid broadcast domain based on the replication requirement. The described aspects can use the "Replication Threshold Count" (RTC) and the "current replication count" to classify a broadcast domain into one of three types: the first type is the ingress replication type of broadcast domain; the second type is the underlay multicast type of broadcast domain; and the third type is a hybrid broadcast domain which can include both the first type and the second type in the same broadcast domain.

Replication Threshold Count

The Replication Threshold Count can be a global predefined count which represents the replication capacity of a given VTEP. For example, a low-capacity VTEP device which supports low-speed ports and low replication resources may set the RTC to a lower value while a high-capacity VTEP device which supports high-speed ports and high replication resources may set the RTC to a higher value. The RTC can be configured by an administrator upon creation of the VXLAN segment based on the capacity of the device or the device itself can derive the RTC based on the maximum supported capacities of the device. The RTC can be applicable to all the broadcast domains created in a given ingress VTEP.

If the RTC is not configured, the system can use a default value of, e.g., "2" when a given device is capable of both ingress replication and underlay multicast. This value of "2" can indicate that for at the most two discovered remote endpoints in the broadcast domain, the ingress VTEP can continue using the ingress replication model (i.e., set the BD type to the first type), while for three or more discovered remote endpoints in the broadcast domain, the ingress VTEP can use either the underlay multicast model or the hybrid model (i.e., set the BD type to the second type or the third type). The notation "RTCx=2" indicates that the RTC for VTEPx is set to 2.

Optional Parameter in BGP Open Message

Each VTEP can communicate its RTC to its peer VTEPs via the BGP Open message. The BGP Open message can include an optional parameter, which can be used for advertising capacity and capability. FIG. 3 illustrates an exemplary format of an optional parameter 300 used in a Border Gateway Protocol (BGP) message to indicate capacity and capability, in accordance with an aspect of the present application. Optional parameter 300 can include: a capability code 302 (comprising 1 octet), which can indicate a capability as the replication threshold; a capability length 304 (comprising 1 octet), which can indicate a size of the optional parameters; and a capability value 306 (comprising a variable size), which can indicate a value of the replication threshold.

By using the third type of broadcast domain (i.e., a hybrid BD which allows one or both of ingress replication and underlay multicast), the described aspects can be both self-balancing (as the BGP Open messages are updated upon VTEPS being established in a BGP session) and active (as the broadcast domain can be updated based on the advertised VNI membership in the EVPN IMET updates).

Current Replication Count

The current replication count can indicate the running or on-demand count of the number of VXLAN endpoints discovered by the EVPMN IMET RT-3 advertisement updates. The described aspects can leverage the EVPN table to determine the current replication count per a specific broadcast domain. The Replication Threshold Count may be global and static (for a given BGP session), while the current replication count (for a given VXLAN broadcast domain) can be dynamic since it is based on the discovered VTEPs via the dynamically sent advertisement updates. Furthermore, the current replication count may ignore any local directly attached ports and may indicate only the number of remote tunnel endpoints.

FIG. 4A depicts a table 400 of the current replication count for the devices and networks of the environment of FIG. 1, in accordance with an aspect of the present application. Table 400 can include entries 420-428 with fields indicating the broadcast domain (broadcast domain 402) and the respective VXLANS (VXLAN1 404, VXLAN2 406, VXLAN3 408, VXLAN4 410, and VXLAN5 412) advertised in the network. Each entry in table 400 can indicate the current replication count for each VTEP/VNI/VXLAN domain. That is, each entry can correspond to the number of remote endpoints discovered corresponding to the environment of FIG. 1 using the ingress replication model of FIG. 2A.

The notation "Cx(y)" can indicate the current replication count on VTEPx for VLAN y. Thus, as shown in entry 424, C3(5)=2 can indicate that the current replication count on VTEP3 106 for VXLAN5 is 2 (also indicated in entry 224 of table 200 as "V45" which represents the two VTEPs VTEP4 108 and VTEP5 110).

Selection of Broadcast Domain Type

As described above, the system can use the RTC and the current replication count to classify a broadcast domain (BD) into one of three types. In the first type of BD (ingress replication), all the participating VTEPs in the BD may have a low replication demand or are ingress replication-capable devices. In the second type of BD (underlay multicast), all the participating VTEPs in the BD may have a high replication demand or are underlay multicast replication-capable devices. In the third type of BD (hybrid), some of the participating VTEPs may have a low replication demand or do not support the underlay multicast replication model, while others of the participating VTEPs may have a high replication demand and do support the underlay multicast replication model.

FIG. 4B depicts an algorithm 430 for selecting the replication type for a broadcast domain, in accordance with an aspect of the present application. Algorithm 430 can include a section 432 which defines the terms used in subsequent sections of pseudocode 434, 436, and 438. In section 432, the following terms are defined:

"RTCx": Replication Threshold Count configured on VTEP x,

"RTCx=0": The given device at VTEP x is only ingress replication-capable,

"Cx(y)": Current replication count on VTEP x for VLAN y, and

"T (BDx(y))": Type of broadcast domain at VTEP x for VLAN y.

Section 434 indicates that, at a given VTEP x for VLAN y, if the current replication count is less than or equal to (i.e., not greater than) the RTC of the given VTEP or if the RTC of the given VTEP x has a value of "0," then the type of the broadcast domain for the given VTEP x for VLAN y is set to the first type (ingress Replication BD). Section 436 indicates that, at the given VTEP x for VLAN y, if the current replication count is greater than the RTC of the given VTEP x, then the type of the broadcast domain for the given VTEP x for VLAN y is set to the second type (underlay multicast BD). Section 438 indicates that for all the BDs which are set to the second type, the system can iterate through all the remote endpoints (VTEPz) advertised in BDx(y) (i.e., the broadcast domain at VTEP x for VLAN y). If the remote VTEPz has a RTC with a value of "0," this indicates that the remote VTEPz is ingress capable, as published in the EVPN table, which is updated based on the optional parameter of the capability advertisement in the BGP Open message, as described above in relation to FIG. 3. As a result, if "RTCz=0," then the type of the broadcast domain for the given VTEP x for VLAN y is set to the third type (hybrid BD).

Creating the Efficient Broadcast Domain

After determining, setting, or selecting the broadcast domain using the algorithm described above in relation to FIG. 4B, the system can create the efficient broadcast domain based on the workload, i.e., the RTC and the current replication count.

For all broadcast domains categorized as "ingress replication BD," the system can create these with unicast tunnels along with the physical ports of the VLAN, where the unicast tunnels are based on the discovered tunnel endpoints. In this model, the unicast tunnels can be added to the replication group or broadcast domain.

For all broadcast domains categorized as "underlay multicast BD," the system can create these by adding the multicast/multipoint tunnels along with the physical ports of the BD VXLAN into the replication group. The device can send a PIM Join request to receive the flood traffic downstream and can send the multicast VXLAN tunnel packet to the multicast IP group address (e.g., via a Rendezvous Point (RP)).

For all broadcast domains categorized as "hybrid BD," the system can iterate through the broadcast domain associated with the VXLAN to identify the remote endpoints which support "underlay multicast" and "ingress replication" models, e.g., by searching the EVPN table. The system can create the hybrid BD by adding the ingress replication-supported remote tunnels as unicast tunnels and by adding the underlay multicast-supported remote tunnels as multicast tunnels along with the physical local ports. As described above for the second type (i.e., all BDs categorized as "underlay multicast BD"), the device can send a PIM Join request to receive the flood traffic downstream and can send the multicast VXLAN tunnel packet to the multicast IP group address.

Continuing with the example of FIG. 1, assume that all five of the VTEPS depicted in network 100 (i.e., VTEP1 102, VTEP2 104, VTEP3 106, VTEP4 108, and VTEP5 110) have an RTC configured or set to a default value of "2." The resulting broadcast domains are depicted below in relation to FIG. 4C.

Figures 4C, 5:
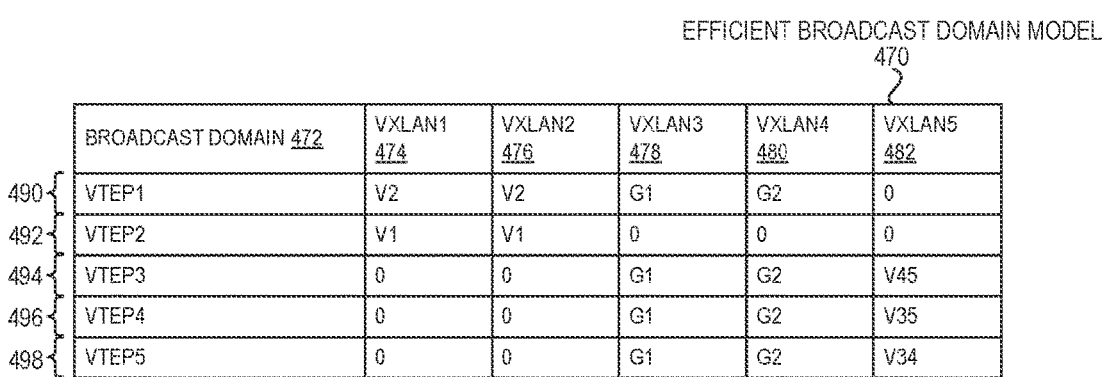
FIG. 4C depicts a table of the efficient broadcast domain model using the algorithm of FIG. 4B on the environment of FIG. 1, in accordance with an aspect of the present application.
FIG. 5 illustrates an environment depicting an overlay network connected in a mesh topology, based on the efficient broadcast domain model represented by the table in FIG. 4C, in accordance with an aspect of the present application.

FIG. 4C depicts a table 470 of the efficient broadcast domain model using the algorithm of FIG. 4B on the environment of FIG. 1, in accordance with an aspect of the present application. Table 470 can include entries 490-498 with fields indicating the broadcast domain (broadcast domain 472) and the respective VXLANS (VXLAN1 474, VXLAN2 476, VXLAN3 478, VXLAN4 480, and VXLAN5 482) advertised in the network. Each entry in table 470 can indicate the broadcast domain (BD) for each VTEP/VNI/VXLAN domain using the efficient broadcast domain model, i.e., based on the above-described selection method and algorithm of FIG. 4B.

As an example, BD5(5) is set to "V34" (VTEP3 106 and VTEP4 108, as illustrated in entry 498 of FIG. 4C) because the current replication count on VTEP5 110 for VLAN5 is "2" (as indicated by entry 428 of FIG. 4A), which does not exceed the default RTC threshold of "2" for VTEP5 110. Continuing to apply the algorithm of FIG. 4B, BD5(4) is set to "G2" (as illustrated in entry 498 of FIG. 4C) because the current replication count on VTEP5 110 for VLAN4 is "3" (as indicated by entry 428 of FIG. 4A), which does exceed the default RTC threshold of "2" for VTEP5 110. "BD5(4) =G2" can also indicate that the broadcast domain of VLAN 4 at VTEP 5 has the multicast tunnels mapped to the multicast IP group address for G2, where VTEP1 102, VTEP3 106, VTEP4 108, and VTEP5 110 have joined the G2 tree (as described above in relation to FIG. 2B). Thus, the broadcast domain for VTEP5 110 across its advertised VXLANs is a hybrid domain which includes both multicast and unicast tunnels, as BD5(4) includes the multicast tunnel to G2 and BD5(5) includes the unicast tunnels to VTEP3 106 and VTEP4 108.

FIG. 5 illustrates an environment depicting an overlay network 500 connected in a mesh topology, based on the efficient broadcast domain model represented by the table in FIG. 4C, in accordance with an aspect of the present application. Similar to overlay network 100 of FIG. 1, overlay network 500 can include five network devices (502, 504, 506, 508, and 510) and end devices (e.g., client device or servers, not shown) coupled to the network devices. Network devices 502-510 can operate as tunnel endpoints (e.g., VTEPs in a VXLAN) in overlay network 500, and overlay network 100 can be a distributed tunnel fabric in which network devices 502-510 can be coupled to each other via tunnels.

Each of network devices 502-510 can be indicated with the list of advertised VLANs (or VNIs for VXLANs). For example: a VTEP1 502 node can advertise VXLANs as indicated by (1,2,3,4); a VTEP2 504 node can advertise VXLANs as indicated by (1,2); a VTEP3 506 node can advertise VXLANs as indicated by (3, 4, 5); a VTEP4 508 node can advertise VXLANs as indicated by (3, 4, 5); and a VTEP5 510 node can advertise VXLANs as indicated by (3, 4, 5).

Network 500 can depict the hybrid broadcast domain represented by table 470 in FIG. 4C, including unicast tunnels and multicast tunnels in the same broadcast domain. An index 530 can indicate the various types of tunnels: possible unicast tunnels can be depicted with a light dashed line; hybrid BD unicast tunnels corresponding to table 470 can be depicted with a heavy dotted line; hybrid BD multicast tunnels for G1 can be depicted with a heavy solid line; and hybrid BD multicast tunnels for G2 can be depicted with a heavy dashed line.

For example, network 500 can indicate that VTEP1 502, VTEP3 506, VTEP4 508, and VTEP5 510 (which each advertise VXLAN4, which is mapped to G2) have joined the G2 tree and are using multicast tunnels associated with the multicast IP group address for G2, as indicated by the heavy dashed lines from G2 522 to the respective VTEPs (VTEP1 502, VTEP3, 506, VTEP4 508, and VTEP5 110) (e.g., a heavy dashed line 540 from VTEP3 506 to G2 522). Similarly, network 500 can indicate that VTEP1 502, VTEP3 506, VTEP4 508, and VTEP5 510 (which each advertise VXLAN3, which is mapped to G1) have joined the G1 tree and are using multicast tunnels associated with the multicast IP group address for G1, as indicated by the heavy solid lines from G1 520 to the respective VTEPs (VTEP1 502, VTEP3, 506, VTEP4 508, and VTEP5 110) (e.g., a heavy solid line 542 from VTEP1 502 to G1 520).

At the same time, VTEP1 502 has determined and added a unicast tunnel 544 to VTEP2 504, via which to transmit multicast VXLAN packets on VXLAN1 and VXLAN2, as indicated by entry 490 in FIG. 4C and by the heavy dotted line (544) from VTEP1 502 to VTEP2 504. Similarly, VTEP2 504 has determined and added a (same) unicast tunnel 540 to VTEP1 502, via which to transmit multicast VXLAN packets on VXLAN1 and VXLAN, as indicated by entry 492 and by the same heavy dotted line (540) from VTEP2 504 to VTEP1 502.

As another example, VTEP3 506 has determined and added unicast tunnels 552 and 554 to VTEP4 508 and VTEP5 510, as indicated by entry 494 in FIG. 4C and by the heavy dotted lines (552 and 554) from VTEP3 506 to VTEP4 508 and VTEP5 510. Entries 496 and 498 indicate similar determined and added unicast tunnels 552/556 and 554/556, respectively, from VTEP4 508 to VTEP3 506 and VTEP5 510 and from VTEP5 510 to VTEP3 506 and VTEP4 508, as indicated by the heavy dotted lines (552, 554, and 556).

Thus, table 470 and network 500 demonstrate how a broadcast domain for a VTEP over various VXLANs can include either an ingress replication model (first type) or an underlay multicast model (second type) (as in entry 492) or a hybrid model (third type) which includes both the ingress replication model and the underlay multicast model (as in entries 490, 494, 496, and 498).

Comparison of Received, Transmitted, and Dropped Packets Using Three Types of Broadcast Domain Models FIGS. 6A-C depict tables comparing the performance of the environment of FIG. 1 based on the ingress replication model, the underlay multicast model, and the efficient hybrid broadcast domain model, in accordance with an aspect of the present application.

In FIG. 6A, table 600 indicates the performance of network 100 based on the ingress replication model. Each of entries 610-618 in table 600 can include: a tunnel endpoint (TEP) 602, such as a VTEP; a number of packets received (RX 604) if a flood occurs at the remote VTEPs on the VXLANs also advertised by the corresponding TEP; a number of packets transmitted (TX 606) if a single packet is sent or a flood occurs on the corresponding VTEP; and a number of packets which are dropped or suffer ingress discard (in discards 608) based on the chosen replication model. For example, based on the network 100 of FIG. 1 and the ingress replication model table 200 of FIG. 2A, entry 610 indicates a total of 8 packets received: if a flood occurs on VLAN1 at VTEP2 104, VTEP1 102 will receive 1 packet; if a flood occurs on VLAN2 at VTEP2 104, VTEP1 102 will receive 1 packet; if a flood occurs on VLAN3 at VTEP3 106, VTEP4 108, and VTEP5 110, VTEP1 102 will receive 3 packets, i.e., one packet from each of these three VTEPs; and if a flood occurs on VLAN4 at VTEP3 106, VTEP4 108, and VTEP5 110, VTEP1 102 will receive 3 packets, i.e., one packet from each of these three VTEPs.

Entry 610 also indicates a total of 8 packets transmitted. If a single packet is sent or a flood occurs at VTEP1 102: on VLAN1, VTEP1 102 will send 1 packet to VTEP2 104; on VLAN2, VTEP1 102 will send 1 packet to VTEP2 104; on VLAN3, VTEP1 102 will send 3 packets to each of VTEP3 106, VTEP4 108, and VTEP5 110; and on VLAN4, VTEP1 102 will send 3 packets to each of VTEP3 106, VTEP4 108, and VTEP5 110. As described above in relation to FIG. 1, ingress replication can result in zero in discards (as illustrated in table 600), but an ingress node (or TEP) may suffer from insufficient replication resources.

In FIG. 6B, table 630 indicates the performance of network 100 based on the underlay multicast model. Each of entries 640-648 in table 630 can include information similar to table 600 of FIG. 6A, including: a TEP 632; a number of packets received (RX 634); a number of packets transmitted (TX 636); and a number of in discards 638 based on the chosen replication model. For example, based on the network 100 of FIG. 1 and the underlay multicast model table 240 of FIG. 2B, entry 642 indicates a total of 13 packets received: if a flood occurs on VLAN1 at VTEP1 102, VTEP2 104 will receive 1 packet (via G1); if a flood occurs on VLAN2 at VTEP1 102, VTEP1 102 will receive 1 packet (via G1); if a flood occurs on VLAN3 at VTEP1 102, VTEP3 106, VTEP4 108, and VTEP5 110, VTEP2 104 will receive 4 packets (via G1), i.e., one packet from each of these four VTEPs; if a flood occurs on VLAN4 at VTEP1 102, VTEP3 106, VTEP4 108, and VTEP5 110, VTEP2 104 will receive 4 packets (via G2), i.e., one packet from each of these four VTEPs; and if a flood occurs on VLAN5 at VTEP3 106, VTEP4 108, and VTEP5 110, VTEP2 104 will receive 3 packets (via G1).

Entry 642 also indicates a total of 2 packets transmitted by VTEP2 104. If a single packet is sent or a flood occurs at VTEP2 104: on VLAN1, VTEP2 104 will send 1 packet to VTEP1 102; on VLAN2, VTEP2 104 will send 1 packet to VTEP1 102. As described above in relation to FIG. 1, underlay multicast can result a significantly reduced number of packets transmitted, but can result in a significantly higher number of in discards (as illustrated in table 630).

In FIG. 6C, table 660 indicates the performance of network 100 (or similarly, network 500 of FIG. 5) based on the efficient broadcast domain model. Each of entries 670-678 in table 660 can include information similar to table 600 of FIG. 6A, including: a TEP 662; a number of packets received (RX 664); a number of packets transmitted (TX 666); and a number of in discards 668 based on the chosen replication model. For example, based on the network 100 of FIG. 1 and the hybrid efficient broadcast domain table 470 of FIG. 2B, entry 670 indicates: a total of 8 packets received (664) (similar to entry 610 of the ingress replication model table 600); a total of 4 packets transmitted (666) (similar to entry 640 of the underlay multicast model table 630); and a total of 0 in discards (668) (similar to entry 610 of the ingress replication model table 600). Thus, FIG. 6C demonstrates that the hybrid broadcast domain model (hybrid model or third type) can eliminate ingress discards (similar to using only the ingress replication model) and can reduce the number of transmitted packets (similar to using only the underlay multicast model). When compared to the ingress replication model, the hybrid model can result in a more efficient transmit count due to less traffic being sent unnecessarily via multicast groups (e.g., ~200% improvement in replicating flood packets). When compared to the underlay multicast model, the hybrid model can also result in a more efficient receive count due to less traffic being sent unnecessarily via multicast groups, which can further result in a significantly decreased number of in discards (e.g., ~150% improvement in utilizing underlay traffic).

Method for Facilitating Building an Efficient Broadcast Domain Based on Workload FIG. 7A presents a flowchart 700 illustrating a method for facilitating building an efficient EVPN VXLAN broadcast domain based on workload, in accordance with an aspect of the present application. During operation, the system determines a replication threshold for a device in an overlay network, wherein the device operates as a tunnel endpoint, and wherein the replication threshold indicates a capacity of replication resources of the device (operation 702). The device can be a tunnel endpoint (TEP), and in a VXLAN, the device can be a virtual TEP (VTEP). The replication threshold can be referred to as the "Replication Threshold Count" or "RTC," and can be stored in the EVPN table based on an optional parameter included in a BGP Open message transmitted between the endpoints, as described above in relation to FIG. 3. In some aspects, the RTC for a network device can be set to a default value of 2, which can indicate that the network device is both ingress replication-capable and underlay multicast-replication capable. The system obtains a current replication count for the device corresponding to a respective virtual extensible local area network (VXLAN) (operation 704), as described above in relation to table 400 of FIG. 4A.

The system selects a replication type for a broadcast domain specific to the device and the respective VXLAN based on the replication threshold and the current replication count (operation 706). The replication type indicates one of: a first type associated with an ingress replication broadcast domain comprising unicast tunnels; a second type associated with an underlay multicast broadcast domain comprising multicast tunnels; and a third type associated with a hybrid broadcast domain comprising a combination of the first type and the second type (i.e., comprising both unicast and multicast tunnels). The system can select the replication type based on the algorithm (430) described above in relation to FIG. 4B. The system can use a combination of the RTC (as stored in the EVPN table of the device) and the dynamically learned current replication count (based on information exchanged with its peer nodes) to categorize or determine the replication type for a given broadcast domain and respective VXLAN (e.g., BDx(y), as described above in relation to FIGS. 4B and 4C).

The system creates the broadcast domain specific to the device and the respective VXLAN based on the selected replication type (operation 708). If the selected replication type is the first type, the system adds a unicast tunnel to the ingress replication broadcast domain, as described above in relation to FIGS. 1, 2A, and 5. If the selected replication type is the second type, the system adds a multicast tunnel to the multicast underlay broadcast domain, as described above in relation to FIGS. 1, 2B, and 5. If the selected replication type is the third type, the system adds to the hybrid broadcast domain: a unicast tunnel associated with the respective remote endpoint capable of ingress replication; and a multicast tunnel associated with a multicast group for the respective remote endpoint (as described above in relation to FIGS. 4B, 4C, and 5).

Figure 7B:
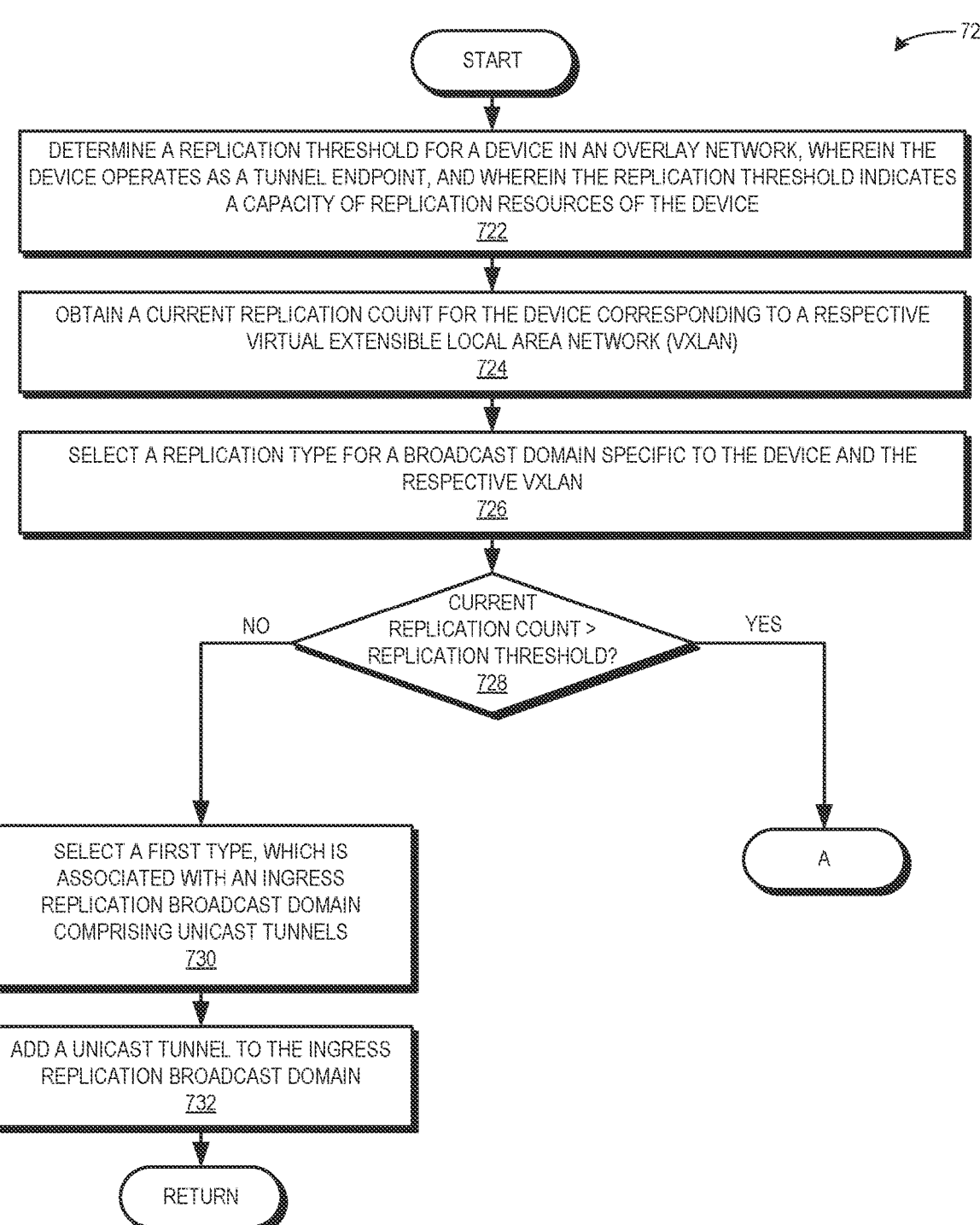
FIGS. 7B-7C present flowcharts illustrating a method for facilitating building an efficient EVPN VXLAN broadcast domain based on workload, in accordance with an aspect of the present application.
Figure 7C:
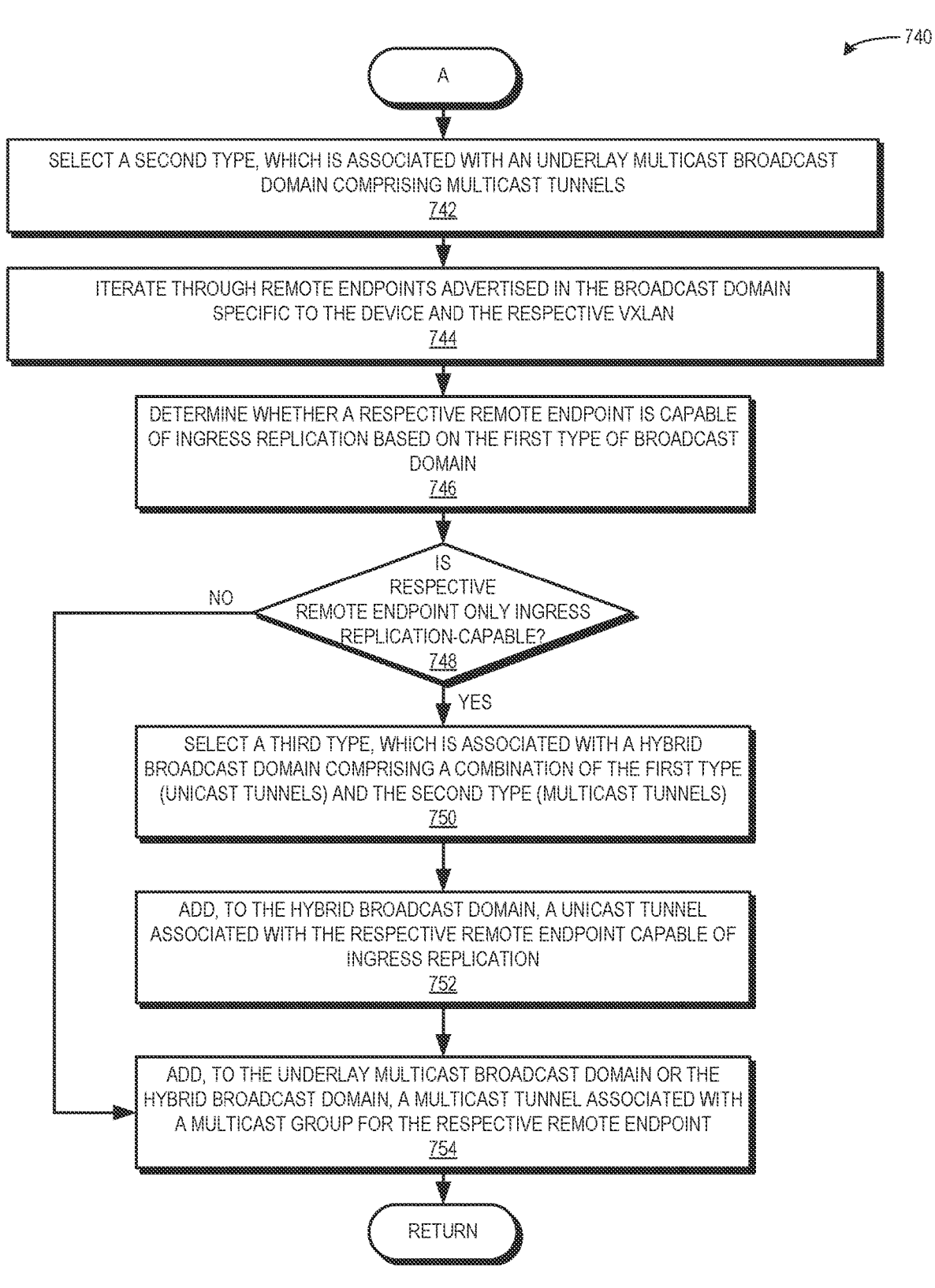

FIGS. 7B-7C present flowcharts 720 and 740 illustrating a method for facilitating building an efficient EVPN VXLAN broadcast domain based on workload, in accordance with an aspect of the present application. In flowchart 720 of FIG. 7B, the system determines a replication threshold for a device in an overlay network, wherein the device operates as a tunnel endpoint, and wherein the replication threshold indicates a capacity of replication resources of the device (operation 722, similar to operation 702 of FIG. 7A). The system obtains a current replication count for the device corresponding to a respective virtual extensible local area network (VXLAN) (operation 724, similar to operation 704 of FIG. 7A).

The system selects a replication type for a broadcast domain specific to the device and the respective VXLAN (based on the replication threshold and the current replication count) (operation 726, similar to operation 706 of FIG. 7A). The replication type can indicate one of three types, as described herein. The system can select the replication type based on the algorithm (430) described above in relation to FIG. 4B. The system can use a combination of the RTC (as stored in the EVPN table of the device) and the dynamically learned current replication count (based on information exchanged with its peer nodes) to determine or define the replication type for a given broadcast domain and respective VXLAN (e.g., BDx(y), as described above in relation to FIGS. 4B and 4C).

If the current replication count is not greater than (i.e., is less than or equal to) the replication threshold (decision 728), the system selects a first type, which is associated with an ingress replication broadcast domain comprising unicast tunnels (operation 730), as described above in relation to section 434 of FIG. 4B. The system adds a unicast tunnel to the ingress replication broadcast domain (operation 732) and the operation returns. If the current replication count is greater than the replication threshold (decision 728), the operation continues at Label A of FIG. 7C.

In flowchart 740 of FIG. 7C, the system selects a second type, which is associated with an underlay multicast broadcast domain comprising multicast tunnels (operation 742), as described above in relation to section 436 of FIG. 4B. The system iterates through remote endpoints advertised in the broadcast domain specific to the device and the respective VXLAN (operation 744), by performing operation 746, decision 748, and operations 750, 752, and 754. The iteration is described above in relation to section 438 of FIG. 4B.

The system determines whether a respective remote endpoint is capable of ingress replication based on the first type of broadcast domain (operation 746). If the respective remote endpoint is not only ingress replication-capable (decision 748), the operation continues at operation 754. That is, the system adds to the underlay multicast broadcast domain, a multicast tunnel associated with a multicast group for the respective remote endpoint (operation 754).

If the respective remote endpoint is only ingress replication-capable (decision 748), the system selects a third type, which is associated with a hybrid broadcast domain comprising a combination of the first type (unicast tunnels) and the second type (multicast tunnels) (operation 750). Determining whether a remote endpoint is only ingress replication-capable can be based on determining that the replication threshold count for the remote endpoint is set to a value of 0, as described above in relation to section 438 of FIG. 4B. The system adds, to the hybrid broadcast domain, a unicast tunnel associated with the respective remote endpoint capable of ingress replication (operation 752) and also adds, to the hybrid broadcast domain, a multicast tunnel associated with a multicast group for the respective remote endpoint (operation 754). Thus, the system iterates through the remote endpoints for the broadcast domain and determines whether any are only ingress replication-capable, in which case the hybrid replication type is selected, a unicast tunnel is added, and multicast tunnels are added for the remote endpoints which are not only ingress replication-capable, as described above in relation to efficient broadcast domain model table 470 of FIG. 4C and overlay network 500 of FIG. 5.

Figure 8:
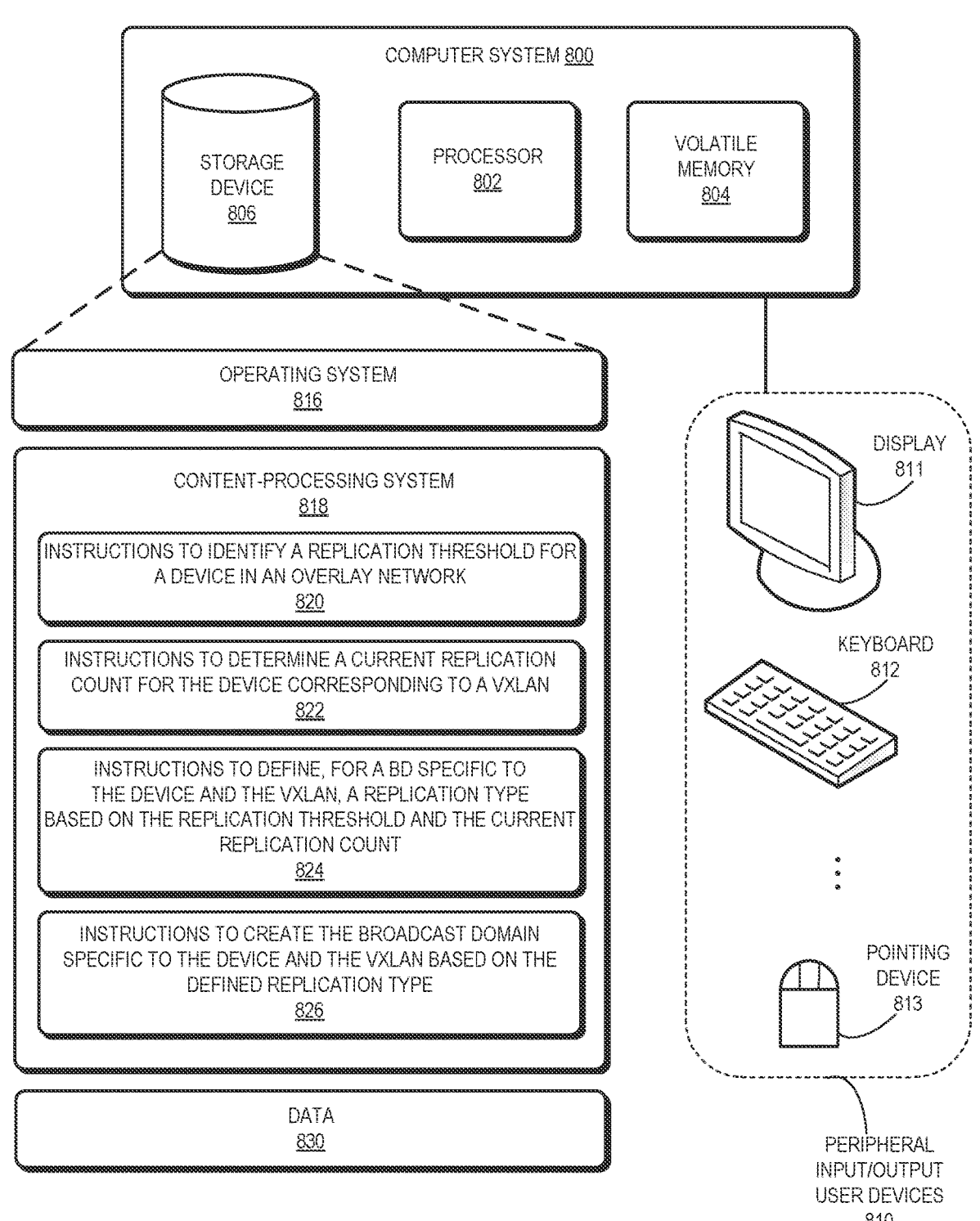
FIG. 8 illustrates a computer system for facilitating building an efficient EVPN VXLAN broadcast domain based on workload, in accordance with an aspect of the present application.

Computer System for Facilitating Building an Efficient Broadcast Domain Based on Workload FIG. 8 illustrates a computer system 800 for facilitating building an efficient EVPN VXLAN broadcast domain based on workload, in accordance with an aspect of the present application. Computer system 800 includes a processor 802, a memory 804, and a storage device 806. Memory 804 can include a volatile memory (e.g., random access memory (RAM)) that serves as a managed memory and can be used to store one or more memory pools. Furthermore, computer system 800 can be coupled to peripheral I/O user devices 810 (e.g., a display device 811, a keyboard 812, and a pointing device 813). Storage device 806 includes non-transitory computer-readable storage medium and stores an operating system 816, a content-processing system 818, and data 830. Computer system 800 may include fewer or more entities or instructions than those shown in FIG. 8.

Content-processing system 818 can include instructions, which when executed by computer system 800, can cause computer system 800 to perform methods and/or processes described in this disclosure. Specifically, content-processing system 818 may include instructions 820 to identify a replication threshold for a device in an overlay network. The device can operate as a tunnel endpoint in the overlay network, and the replication threshold can indicate a capacity of replication resources of the device. Content-processing system 818 may include instructions 822 to determine a current replication count for the device corresponding to a respective VXLAN, as described above in relation to table 400 of FIG. 4A. Content-processing system 818 may include instructions 824 to define, for a broadcast domain specific to the device and the respective VXLAN, a replication type based on the replication threshold and the current replication count. The replication type can indicate one of three types (i.e., ingress replication, underlay multicast, or hybrid), as described above in relation to FIGS. 4B, 4C, and 5. Content-processing system 818 may include instructions 826 to create the broadcast domain specific to the device and the respective VXLAN based on the defined replication type, as described above in relation to overlay network 500 of FIG. 5.

Data 830 can include any data that is required as input or that is generated as output by the methods, operations, communications, and/or processes described in this disclosure. Specifically, data 830 can store at least: a data packet; a control packet; a replication threshold count; a default value; a current replication count; a replication type; an indicator of a unicast tunnel or a multicast tunnel; a multicast group identifier; a multicast group IP address; a table; a data structure; an EVPN table; a configuration; maximum supported capabilities of a device; an indicator of whether a remote endpoint is only capable of ingress replication; a BGP message; an optional parameter; a code; a length; and a value.

Computer system 800 and content-processing system 818 may include more instructions than those shown in FIG. 8. For example, content-processing system 818 can also store instructions for executing the operations described above in relation to: overlay network 100 of FIG. 1; algorithm 430 of FIG. 4B; efficient broadcast domain model table 470 of FIG. 4C; overlay network 500 of FIG. 5; the operations depicted in the flowcharts of FIGS. 7A-7C; and the instructions of non-transitory computer-readable storage medium 900 in FIG. 9.

Non-Transitory Computer-Readable Medium for Facilitating Building an Efficient Broadcast Domain Based on Workload FIG. 9 illustrates a non-transitory computer-readable medium (CRM) 900 for facilitating building an efficient EVPN VXLAN broadcast domain based on workload, in accordance with an aspect of the present application. CRM 900 can store instructions that when executed by a computer cause the computer to perform the methods, operations, and functions described herein. Specifically, CRM 900 can store instructions 902 to determine a capacity of replication resources for a device in an overlay network. CRM 900 can store instructions 904 to obtain a current replication count for the device corresponding to a respective VXLAN, wherein the device operates as a tunnel endpoint. CRM 900 can further store instructions 906 to select a replication type (i.e., ingress replication, underlay multicast, or hybrid) for a broadcast domain specific to the device and the respective VXLAN based on the capacity of replication resources and the current replication count. CRM 900 can store instructions 908 to create the broadcast domain specific to the device and the respective VXLAN based on the selected replication type.

CRM 900 can additionally include instructions 910 to iterate through remote endpoints advertised in the broadcast domain to determine ingress replication-capable-only endpoints and select the hybrid broadcast domain. CRM 900 can also store instructions 912 to communicate the replication threshold to remote tunnel endpoints via BGP messages.

CRM 900 may include more instructions than those shown in FIG. 9. For example, CRM 900 can also store instructions for executing the operations described above in relation to: overlay network 100 of FIG. 1; algorithm 430 of FIG. 4B; efficient broadcast domain model table 470 of FIG. 4C; overlay network 500 of FIG. 5; the operations depicted in the flowcharts of FIGS. 7A-7C; and the instructions of content-processing system 818 in FIG. 8.

Aspects and Variations

In general, the disclosed aspects provide a method, computer system, and non-transitory computer-readable storage medium for facilitating efficient iterative collective operations using a network-attached memory. In one aspect, a method is performed, e.g., by a system. The system determines a replication threshold for a device in an overlay network, wherein the device operates as a tunnel endpoint, and wherein the replication threshold indicates a capacity of replication resources of the device. The system obtains a current replication count for the device corresponding to a respective virtual extensible local area network (VXLAN). The system selects a replication type for a broadcast domain specific to the device and the respective VXLAN based on the replication threshold and the current replication count, wherein the replication type indicates one of: a first type associated with an ingress replication broadcast domain comprising unicast tunnels; a second type associated with an underlay multicast broadcast domain comprising multicast tunnels; and a third type associated with a hybrid broadcast domain comprising a combination of the first type and the second type. The system creates the broadcast domain specific to the device and the respective VXLAN based on the selected replication type.

In a variation on this aspect, determining the replication threshold for the device comprises determining at least one of: a configuration set by an administrator based on a capacity of the device; and maximum supported capabilities of the device.

In a further variation, the overlay network comprises an Ethernet Virtual Private Network (EVPN), and the device operates as a virtual tunnel endpoint (VTEP) in the EVPN.

In a further variation, the replication threshold is stored by the network device in a data structure based on control packets transmitted in the EVPN.

In a further variation, selecting the replication type comprises: selecting the first type in response to the current replication count being less than or equal to the replication threshold; and selecting the second type in response to the current replication count being greater than the replication threshold.

In a further variation, subsequent to selecting the second type, the system iterates through remote endpoints advertised in the broadcast domain specific to the device and the respective VXLAN by: determining whether a respective remote endpoint is capable of ingress replication based on the first type of broadcast domain; and in response to determining that the respective remote endpoint is capable of ingress replication, selecting the third type as the replication type for the broadcast domain specific to the device and the respective VXLAN.

In a further variation, creating the broadcast domain comprises the following operations. In response to selecting the first type, the system adds a unicast tunnel to the ingress replication broadcast domain. In response to selecting the second type, the system adds a multicast tunnel to the underlay multicast broadcast domain. In response to selecting the third type: the system adds, to the hybrid broadcast domain, a unicast tunnel associated with the respective remote endpoint capable of ingress replication; and the system adds, to the hybrid broadcast domain, a multicast tunnel associated with a multicast group for the respective remote endpoint.

In a further variation, the system communicates the replication threshold to remote tunnel endpoints via a Border Gateway Protocol (BGP) message.

In a further variation, the BGP message comprises a BGP Open message with an optional parameter. The optional parameter comprises: a code indicating a capability as the replication threshold; a length indicating a size of the optional parameter; and a value of the replication threshold.

In another aspect, a computer system comprises a processor and a storage device storing instructions that when executed by the processor cause the processor to perform a method, i.e., the instructions are to: identify a replication threshold for a device in an overlay network, wherein the device operates as a tunnel endpoint, and wherein the replication threshold indicates a capacity of replication resources of the device; determine a current replication count for the device corresponding to a respective virtual extensible local area network (VXLAN); define, for a broadcast domain specific to the device and the respective VXLAN, a replication type based on the replication threshold and the current replication count, wherein the replication type indicates one of a first type associated with an ingress replication broadcast domain comprising unicast tunnels, a second type associated with an underlay multicast broadcast domain comprising multicast tunnels, and a third type associated with a hybrid broadcast domain comprising a combination of the first type and the second type; and create the broadcast domain specific to the device and the respective VXLAN based on the defined replication type. The instructions can further perform the operations described herein, including in relation to: the communications in FIGS. 1, 4A-4B, 6A-6B, and 7; the operations depicted in the flowcharts of FIGS. 8A-8B; and the instructions of non-transitory computer-readable storage medium 900 in FIG. 9.

In yet another aspect, a non-transitory computer-readable storage medium stores instructions to: determine a capacity of replication resources for a device in an overlay network; obtain a current replication count for the device corresponding to a respective virtual extensible local area network (VXLAN), wherein the device operates as a tunnel endpoint; select a replication type for a broadcast domain specific to the device and the respective VXLAN based on the capacity of replication resources and the current replication count, wherein the replication type indicates one or more of a first type associated with an ingress replication broadcast domain comprising unicast tunnels, a second type associated with an underlay multicast broadcast domain comprising multicast tunnels, and a third type associated with a hybrid broadcast domain comprising a combination of the first type and the second type; and create the broadcast domain specific to the device and the respective VXLAN based on the selected replication type. The instructions can further perform the operations described herein, including in relation to: overlay network 100 of FIG. 1; algorithm 430 of FIG. 4B; efficient broadcast domain model table 470 of FIG. 4C; overlay network 500 of FIG. 5; the operations depicted in the flowcharts of FIGS. 7A-7C; and the instructions of content-processing system 818 in FIG. 8.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:
determining a replication threshold for a device in an overlay network, wherein the device operates as a tunnel endpoint, and wherein the replication threshold indicates a capacity of replication resources of the device;
obtaining a current replication count for the device corresponding to a respective virtual extensible local area network (VXLAN);
selecting a replication type for a broadcast domain specific to the device and the respective VXLAN based on the replication threshold and the current replication count, wherein the replication type indicates one of:
a first type associated with an ingress replication broadcast domain comprising unicast tunnels;
a second type associated with an underlay multicast broadcast domain comprising multicast tunnels; and
a third type associated with a hybrid broadcast domain comprising a combination of the first type and the second type; and
creating the broadcast domain specific to the device and the respective VXLAN based on the selected replication type.

2. The method of claim 1, wherein determining the replication threshold for the device comprises determining at least one of:
a configuration set by an administrator based on a capacity of the device; and
maximum supported capabilities of the device.

3. The method of claim 1,
wherein the overlay network comprises an Ethernet Virtual Private Network (EVPN), and
wherein the device operates as a virtual tunnel endpoint (VTEP) in the EVPN.

4. The method of claim 3, further comprising:
wherein the replication threshold is stored by the device in a data structure based on control packets transmitted in the EVPN.

5. The method of claim 1, wherein selecting the replication type comprises:
selecting the first type in response to the current replication count being less than or equal to the replication threshold; and
selecting the second type in response to the current replication count being greater than the replication threshold.

6. The method of claim 5, wherein subsequent to selecting the second type, the method further comprises:
iterating through remote endpoints advertised in the broadcast domain specific to the device and the respective VXLAN by:
determining whether a respective remote endpoint is capable of ingress replication based on the first type of broadcast domain; and in response to determining that the respective remote endpoint is capable of ingress replication, selecting the third type as the replication type for the broadcast domain specific to the device and the respective VXLAN.

7. The method of claim 6, wherein creating the broadcast domain comprises:

in response to selecting the first type, adding a unicast tunnel to the ingress replication broadcast domain;

in response to selecting the second type, adding a multicast tunnel to the underlay multicast broadcast domain; and in response to selecting the third type:

adding, to the hybrid broadcast domain, a unicast tunnel associated with the respective remote endpoint capable of ingress replication; and adding, to the hybrid broadcast domain, a multicast tunnel associated with a multicast group for the respective remote endpoint.

8. The method of claim 1, further comprising:

communicating the replication threshold to remote tunnel endpoints via a Border Gateway Protocol (BGP) message.

9. The method of claim 8, wherein the BGP message comprises a BGP Open message with an optional parameter, and wherein the optional parameter comprises:

a code indicating a capability as the replication threshold;

a length indicating a size of the optional parameter; and a value of the replication threshold.

10. A computer system, comprising:

a processor; and a storage device storing instructions to:

identify a replication threshold for a device in an overlay network, wherein the device operates as a tunnel endpoint, and wherein the replication threshold indicates a capacity of replication resources of the device;

determine a current replication count for the device corresponding to a respective virtual extensible local area network (VXLAN);

define, for a broadcast domain specific to the device and the respective VXLAN, a replication type based on the replication threshold and the current replication count, wherein the replication type indicates one of:

a first type associated with an ingress replication broadcast domain comprising unicast tunnels;

a second type associated with an underlay multicast broadcast domain comprising multicast tunnels; and a third type associated with a hybrid broadcast domain comprising a combination of the first type and the second type; and create the broadcast domain specific to the device and the respective 18 VXLAN based on the defined replication type.

11. The computer system of claim 10, wherein identifying the replication threshold for the device comprises determining at least one of:

a configuration set by an administrator based on a capacity of the device; and maximum supported capabilities of the device.

12. The computer system of claim 10, wherein the overlay network comprises an Ethernet Virtual Private Network (EVPN), and wherein the device operates as a virtual tunnel endpoint (VTEP) in the EVPN.

13. The computer system of claim 10, wherein defining the replication type for the broadcast domain comprises:

selecting the first type in response to the current replication count being less than or equal to the replication threshold; and selecting the second type in response to the current replication count being greater than the replication threshold.

14. The computer system of claim 13, wherein subsequent to selecting the second type, the instructions are further to:

iterate through remote endpoints advertised in the broadcast domain specific to the device and the respective VXLAN by:

determining whether a respective remote endpoint is capable of ingress replication based on the first type of broadcast domain; and in response to determining that the respective remote endpoint is capable of ingress replication, selecting the third type as the replication type for the broadcast domain specific to the device and the respective VXLAN.

15. The computer system of claim 14, wherein creating the broadcast domain comprises:

adding a unicast tunnel to the ingress replication broadcast domain responsive to selecting the first type;

adding a multicast tunnel to the underlay multicast broadcast domain responsive to selecting the second type; and responsive to selecting the third type:

adding, to the hybrid broadcast domain, a unicast tunnel associated with the respective remote endpoint capable of ingress replication; and adding, to the hybrid broadcast domain, a multicast tunnel associated with a multicast group for the respective remote endpoint.

16. The computer system of claim 10, the instructions further to:

communicate the replication threshold to remote tunnel endpoints via a Border Gateway Protocol (BGP) Open message which includes an optional parameter, wherein the optional parameter comprises:

a code indicating a capability as the replication threshold;

a length indicating a size of the optional parameter; and a value of the replication threshold.

17. A non-transitory computer-readable storage medium storing instructions to:

determine a replication threshold for a device in an overlay network, wherein the replication threshold indicates a capacity of replication resources of the device;

obtain a current replication count for the device corresponding to a respective virtual extensible local area network (VXLAN), wherein the device operates as a tunnel endpoint;

select a replication type for a broadcast domain specific to the device and the respective VXLAN based on the capacity of replication resources and the current replication count, wherein the replication type indicates one or more of:

a first type associated with an ingress replication broadcast domain comprising unicast tunnels;

a second type associated with an underlay multicast broadcast domain comprising multicast tunnels; and a third type associated with a hybrid broadcast domain comprising a combination of the first type and the second type; and create the broadcast domain specific to the device and the respective VXLAN based on the selected replication type.

18. The non-transitory computer-readable storage medium of claim 17, wherein selecting the replication type comprises:

selecting the first type in response to the current replication count being less than or equal to the replication threshold; and selecting the second type in response to the current replication count being greater than the replication threshold.

19. The non-transitory computer-readable storage medium of claim 18, wherein subsequent to selecting the second type, the instructions are further to:

iterate through remote endpoints advertised in the broadcast domain specific to the device and the respective VXLAN by:

determining whether a respective remote endpoint is capable of ingress replication based on the first type of broadcast domain; and in response to determining that the respective remote endpoint is capable of ingress replication, selecting the third type as the replication type for the broadcast domain specific to the device and the respective VXLAN.

20. The non-transitory computer-readable storage medium of claim 17, the instructions further to:

communicate the replication threshold to remote tunnel endpoints via a Border Gateway Protocol (BGP) Open message based on an optional parameter.

* * * * *